United States Patent [19]

Swenson et al.

[11] Patent Number: 5,150,450
[45] Date of Patent: Sep. 22, 1992

[54] METHOD AND CIRCUITS FOR NEURON PERTURBATION IN ARTIFICIAL NEURAL NETWORK MEMORY MODIFICATION

[75] Inventors: Richard M. Swenson; David K. Andes; Donald H. Witcher; Robert A. Licklider; James F. Barbieri, all of Ridgecrest, Calif.

[73] Assignee: The United States of America as represented by the Secretary of the Navy, Washington, D.C.

[21] Appl. No.: 591,318

[22] Filed: Oct. 1, 1990

[51] Int. Cl.$^5$ ...................... G06F 15/18; G06F 15/46
[52] U.S. Cl. ...................................... 395/23; 395/21; 395/24
[58] Field of Search .................. 369/513; 364/807; 395/21, 23, 24

[56] References Cited

U.S. PATENT DOCUMENTS

| | | | |
|---|---|---|---|
| 4,773,024 | 9/1988 | Faggin et al. | 364/513 |
| 4,874,963 | 10/1990 | Alspector | 307/201 |
| 4,951,239 | 8/1990 | Andes et al. | 364/807 |

OTHER PUBLICATIONS

Alspector, "Neural-Style Microsystems That Learn", *IEEE Communications Magazine*, Nov. 1989, pp. 29-36.
McClelland et al., *Explorations in Parallel Distributed Processing*, MIT Press, 1988, pp. 121-160.
Welles et al., "An Electrically Trainable Artifical Neural Network (ETANN) with 10240 Floating Gate Synposes", Proc. Intl. Conf. in Neural Networks, 1989, II-191-196.
Mark Hollar, Simon Tam, Hernan Castro, and Ronald Benson, "An Electrically Trainable Artificial Neural Network (ETANN) with 10240 'Floating Gate' Synapses"; *International Joint Conference on Neural Networks;* Washington, D.C.; Jun. 18-20, 1989; vol. II, pp. 191-196.

*Primary Examiner*—Michael R. Fleming
*Assistant Examiner*—Robert W. Downs
*Attorney, Agent, or Firm*—Stephen J. Church; Melvin J. Sliwka; John L. Forrest, Jr.

[57] ABSTRACT

An artificial neural network has a plurality of output circuits individually perturbable for memory modification or learning by the network. The network has a plurality of synapses individually connecting each of a plurality of inputs to each output circuit. Each synapse has a weight determining the effect on the associated output circuit of a signal provided on the associated input, and the synapse is addressable for selective variation of the weight. A perturbation signal is provided to one input, while data signals are provided to others of the inputs, so that perturbation of each output circuit may be controlled by varying the weights of a set of the synapses connecting the perturbation signal to the output circuits. An output circuit may be selected for perturbation by loading an appropriate weight in the synapse connecting the perturbation signal to the output circuit while zeroing the weights of the synapses connecting the perturbation signal to other output circuits. Where the weights are provided by devices incapable of repeated cycles of zeroing and reloading, each synapse connecting the perturbation intput to an output circuit has an addressable switch which is closed for perturbation of this output circuit and which is open at other times. Perturbations of different output circuits may be balanced by varying the weights of the set of synapses connected to the perturbation input or by varying the weights of another set of the synapses connected to one of inputs which receives a balancing signal.

11 Claims, 7 Drawing Sheets

METHOD AND CIRCUITS FOR NEURON PERTURBATION IN ARTIFICIAL NEURAL NETWORK MEMORY MODIFICATION

BACKGROUND OF THE INVENTION

1. Field of the Invention

The present invention pertains to the field of pattern recognition. More particularly, the invention pertains to the field of circuits and methods for use in adaptive pattern recognizers capable of supervised or unsupervised memory modification or learning.

2. Description of the Related Art

Artificial neural networks (ANN's) having parallel, distributed processing are recognized as a way to provide extremely fast overall processing with relatively slow elements, pattern recognition by learning from prototypes with subsequent minimal functional degradation due to noisy inputs, and effective functioning despite deficient or inoperable elements, this last feature providing high yields of ANN integrated circuits and continued effective operation despite element failure and physical damage. Although extensive theoretical research and digital simulations have been performed in connection with ANN's, their practical application depends on the development of circuits and methods for learning or memory modification in an ANN embodied in a practical and mass producible integrated circuit having vast numbers of elements functioning in parallel.

A representative ANN is depicted conceptually and conventionally in FIG. 1, and has two "neurons" 10, each providing an output 11 of the network, and four data inputs 12. The inputs are individually connected to the neurons by eight "synapses" 13. To make exposition possible, the network is much simpler than any practically useful ANN integrated circuit having, for example, sixty-four neurons each with one hundred and twenty-eight inputs. Typically, an artificial neural network, such as that of FIG. 1 but having many more elements, is used as one "layer" of a more complex network in which outputs, such as 11, of one layer are data inputs, such as inputs 12, to another layer. It is evident that such complex networks are best practically implemented with very large scale integrated circuits and, typically, with complementary metal oxide semiconductor (CMOS) technology. Therefore, methods and circuits described herein, both of the prior art and of the present invention, should be considered as they might be implemented in very large scale integrated circuits in which several connected such layers each have thousands of synapses.

In FIG. 1 each synapse 13 is depicted as having a variable conductance 15, represented by the conventional symbol for a variable resistance to indicate that a signal, typically a voltage signal, on each input 12 determines a signal, typically a current signal, to a summing circuit 16 of each neuron 10. The variable conductance may be provided by an active circuit, and the synapse may function as a sink and/or a source of the current determined by the synapse. This current is proportional to the strength of the corresponding input signal and to a "weight" which is the conductance 15 of the synapse. The output of each circuit 16 corresponds to the sum of the currents determined by the associated synapses and is provided to a function generator 18 which drives the corresponding output 11 to provide a, typically voltage, output signal. This output signal thus corresponds to a predetermined relation or activation function applied to such sum of the currents. It is well-known that by suitable adjustments to the weights, that is, modification of the "memory" of the network occurring when the memory "learns", the output signals may be made to assume desired values corresponding to predetermined values of the input signals. The usefulness of an artificial neural network is thus dependent on the practicality of its arrangements for memory modification as embodied in an actual circuit.

Several kinds of circuit elements may be used to provide the synapse weights or conductances 15 and for adjusting the weights, so that the particular circuit arrangements employed in an artificial neural network using a method of the present invention depend on many considerations including the manner of implementing the variable weights. The variable weights may be implemented by an actual variable resistance of some kind, by a digitally switched resistance network, or by a multiplying analog to digital converter (MDAC) in which a variable, stored digital value is, in effect, multiplied times an input signal to generate an analog signal representing the product of the digital value and a value represented by the input signal current. Each variable synapse weight may also be controlled by a charge on the gate of a field effect transistor, and the use of a floating gate field effect transistor with the transistor serving as a memory element for a weight value represented by the gate charge is believed highly advantageous in an ANN.

In memory modification of an ANN, the general approach is to provide the inputs 12 with successive patterns and, at each presentation, to determine the errors between the values of the signals on the ANN outputs 11 and their desired values. The errors are then used in accordance with the method to modify the weights. In order to carry out memory modification, the ANN of FIG. 1 has elements which are conceptually depicted. These elements include a neuron or column select input 20 to a multiplexer 21 from which two select signal conductors 22 extend individually through the neurons 10 and has an input or row select input 25 to a multiplexer 26 from which four select signal conductors 27 extend individually through the four synapses 13 associated with each input 12. Each synapse 13 has an AND gate 31 which is connected to the corresponding conductors 22 and 27 and which outputs a signal when the synapse is selected by addressing through inputs 20 and 25. Each synapse is depicted as having a weight setting circuit 33 which is activated when the synapse is selected. The ANN has a weight adjustment input 35 from which a conductor 36 branches through the ANN to the setting circuit 33 of each synapse 13. Each synapse is represented as having a switch 37 which is closed to permit setting circuit 33 to adjust conductance 15 of the synapse. Each switch 37 is controlled by a signal provided on a conductor 38 from an input 39 of the ANN. Setting circuit 33 has any suitable structure, which depends on the manner of implementing the conductances 15 and the memory modification method to be used with the ANN, for adjusting the synapse weight represented by a conductance 15 to a desired value determined by a signal provided at input 35. The weight adjustment signal may be a digital value or an analog value representing the adjusted weight, may be a digital or an analog value representing a desired change in the weight, or may be a relatively high voltage pulse for directly modifying a charge on a floating gate.

A well-known memory modification method proposed for an ANN has been described in connection with a multiple adaptive linear neuron or "Madeline" and is commonly referred to as the "Madeline method". In the Madeline method the function provided by each generator 18 is a "signum" or step function so that the output of each neuron 10 can only be in one of two states. In each cycle of learning by the Madeline method, it is necessary to determine the one of the neurons 10 having the input to the function generator 18 of the neuron from the corresponding summing circuit 16 such that this neuron is the one in the network whose output is nearest to changing between the states. The synapse weights or conductances 15 of this neuron are then adjusted and the cycle is repeated. In each memory modification cycle of the Madeline and related methods, the currents to the summing circuits 16, which represent the sums of the signals on the inputs 12 weighted by the corresponding conductances 15, may first be perturbed successively to determine such one neuron nearest to changing. Next, the overall error of the network is determined before and after such a perturbation in current to the summing circuit of the one neuron. Third, if this overall error is decreased by such a perturbation, the conductances 15 of the synapses 13 of the one neuron are adjusted by an amount which is proportional to the perturbation, to the reduction in error, and to the individual signals to the inputs 12 of these synapses. The cycle is repeated until the conductances 15 converge to values providing desired values for the outputs 11.

However, the present invention is not limited to use with the Madeline memory modification method just described, and may be used with other methods wherein a function generator such as generator 18 provides, instead of a signum function, any other suitable function such as a "sigmoid" or S-shaped function indicated in FIG. 1. The present invention is effective when used with such another memory modification method where the neurons are perturbed sequentially, this latter method being generally that of U.S. Pat. No. 5,075,686 issued Dec. 24, 1991 and being subsequently set forth below for illustrative purposes in connection with the subject application.

The ANN of FIG. 1 has conceptually represented elements for carrying out such perturbation in accordance with the prior art by injecting a predetermined perturbation current into the summing circuit 16 of a selected neuron. These elements include a perturbation current input 40 receiving the current, a perturbation current conductor 41 extending through the neurons 10 and branching to each summing circuit, and a switch 44 for each neuron, switch 44 being closed by a signal from an AND gate 46 when the neuron is selected by signals provided to gate 46 on the corresponding neuron select conductor 22 and on a perturbation select signal conductor 47 branching through the ANN from a perturbation select input 48. Perturbation thus occurs when a neuron is selected for perturbation by its gate 46 current is being injected through input 40.

FIG. 2 is a diagram showing details of representative prior art circuits used together in a single neuron 10 and a single synapse 13 of a prior art ANN such as that of FIG. 1. Similar circuits effective in an ANN embodying the present invention will be subsequently described. The FIG. 2 circuits are well-known and are like those of FIG. 1 in being associated with an output 11, a data input 12, column and row select conductors 22 and 27, and elements 31, 33, and 36–38 for weight adjustment. However, the circuits of FIG. 2, which are preferably implemented with CMOS technology, are characterized by synapse 13 having a current sink arrangement serving as a two-quadrant multiplier 50 and including a floating gate FET 51, by neuron 10 having a positive summing node conductor 55 and a negative summing node conductor 56 extending through synapse 13, and by neuron 10 having a transconductance amplifier 58 connected to conductors 55 and 56 and a transimpedance amplifier 59 driving output 11. Amplifiers 58 and 59 together perform the functions of the FIG. 1 summing circuit 16 and function generator 18. Each node 55 or 56 is supplied with current through a series resistor and diode arrangement 60, and the multiplier 50 of each synapse 13 is a drain for this current. Multiplier 50 has a pair of FET's 63 and 64 connected respectively to nodes 55 and 56, and the gates of these FET's are each connected at a common point 65 to the input 12 associated with the synapse. The floating gate of FET 51 stores a charge representing the above-described synapse weight and the channel of FET 51 is connected between FET 63 and ground so that FET's 51 and 63 are a current drain for node 55 with the drained current being proportional to the product of the signal on input 11 and this weight. The floating gate of FET 51 thus retains such weight as a factor, and FET's 51, 63, and 64 are a two-quadrant multiplier determining the effect of a input signal, as on such an input 12, on an output signal, such as that on an output 11, so that this effect is the product of such a retained factor and the level of the input signal. FET 64 is connected directly to ground and thus drains from node 56 a reference current proportional to the input 11 signal. FET 51 is represented as having a control gate 66 connected to switch 37 and setting circuit 33 for varying, in any suitable manner as before stated, the charge on the floating gate of a FET 51 in response to signals on conductors 36 and 38 addressing the synapse having this floating gate.

It is apparent to one skilled in the art that the elements just described may be selected so as to cause the differential voltage between nodes 55 and 56 to represent the sum of the products of the signals on the inputs, such as input 12, with the weights provided by the synapses, such as 13, corresponding individually to the inputs. This differential voltage is provided to well-known amplifier 58 at the gates of a pair of FET's 70 connected to ground through a bias FET 71. FET's 70 are connected in opposite legs of a current mirror 73 so that amplifier 58 has an output node 75 having a current determined by this differential voltage, this current having a sigmoidal relation to the differential voltage and thereby defining the above-mentioned activation function applied to the sum of the currents determined by each synapse. Output 75 is provided to any suitable circuit, such as amplifier 59, which converts the current at this node to a voltage at the corresponding neuron output 11 and directly proportional to the current determined by the sigmoidal relation.

Although ANN memory modification using perturbation of individual neurons as described above has been extensively studied by digital computer simulation and the construction of ANN's having a relatively limited number of neurons and synapses, a number of problems existing in the implementation of ANN memory modification in practically useful ANN circuits, particularly for ANN's embodied in very large scale integrated circuits, have not been addressed by the prior art.

One such problem arises from the perturbation of individual neurons, exemplified by a neuron 10 in FIG. 1, by injecting a predetermined current into the summing circuit 16 of the neuron from a single current source, whether located on or off an integrated circuit chip embodying the ANN. Such injection requires suitable multiplexing, conductors such as conductor 41, and switches such as switches 44 for what are relatively large currents, the conductors and switches being intertwined with other elements of the chip which, typically, are adapted to voltage signals and minuscule currents. While, the currents required for summing of weighted signals as described above may be relatively large, they are each confined within one neuron and need not be switched.

Another problem arises from the tolerances of integrated circuit construction which result in different conductances and other characteristics in what are intended to be substantially identical elements. As a result, supposedly identical perturbations of different neurons, such as neurons 10, of an ANN result in uncorrelated changes of the neuron outputs 11 so that the calculations, such as those described above, for changes in the values of the conductances, such as 15, do not result in convergence to the desired values of outputs 11 or, at least, require an excessive number of cycles for convergence.

Still another problem occurs when a conductance 15, which is determined by the charge on a floating gate of a field effect transistor, is repeatedly varied to change a neuron 10 between a perturbed state and an unperturbed state, this change in state being generated by changing between a floating gate charge giving a relatively high conductance and such a charge giving a minimum conductance. Changing the charge of a floating gate field effect transistor involves injection of electrons or holes through isolating material surrounding the floating gate with resulting damage to the isolating material. Therefore, loss of isolation of the floating gate is likely to occur before practical memory modification can be achieved by repeated perturbations generated by relatively large changes in a floating gate charge.

SUMMARY OF THE INVENTION

The subject invention is used in perturbation of individual output circuits or neurons of an artificial neural network for memory modification or learning by the network. The network has, conventionally, a plurality of the output circuits, a plurality of input terminals, and a plurality of addressable synapses individually connecting each input terminal to each output circuit. Each synapse has a weight which is selectively variable to control the contribution of a signal on the corresponding input terminal to a signal generated by the corresponding output circuit. The network is subject to memory modification by some method, not otherwise relevant to the present invention, requiring perturbation of the signal from one output circuit while data input to the network is unchanged. In accordance with the invention, a perturbation signal is applied to a perturbation terminal, which may be a predetermined one of the input terminals or may not be accessible externally of the network, while unchanged data signals are applied to other input terminals. The amount of perturbation may be controlled by selecting the weights of the set of the synapses associated with the perturbation terminal and/or by varying the level of the perturbation signal. An output circuit may be selected for perturbation by loading the synapse connecting this circuit and the perturbation input with an appropriate weight while zeroing the weights of the synapses connecting the perturbation terminal to the other output circuits. Where the weighing is by a device damaged by repeated zeroing and reloading cycles, each synapse connected to the perturbation terminal may have an addressable switch through which the perturbation terminal is connected to the output circuit corresponding to the synapse, this switch being closed to perturb the corresponding output circuit and open at other times. The perturbations of the output circuits may be balanced or made effectively equal by varying the weights of the synapses connected to the perturbation terminal or by varying the weights of a set of the synapses connected to another one of the input terminals receiving only a balancing signal.

OBJECTS OF THE PRESENT INVENTION

An object of the present invention is to provide, for each neuron of an artificial neural network, perturbation for use in memory modification or learning of the network.

Another object is to provide methods and circuits facilitating such perturbation in artificial neural networks embodied in very large scale integrated circuits.

Still another object is to provide such circuits particularly effective in an artificial neural network having synapse weight values corresponding to charges on floating gates of a metal oxide semiconductor structure.

A further object is to provide balancing of such perturbations among the neurons of an artificial neural network embodied in an integrated circuit.

BRIEF DESCRIPTION OF THE DRAWINGS

Other objects, advantages, and novel features of the present invention will become apparent from the following detailed description when considered with the accompanying drawings in which.

DETAILED DESCRIPTION OF THE INVENTION

Circuits for Neuron Perturbation

Figure 3:
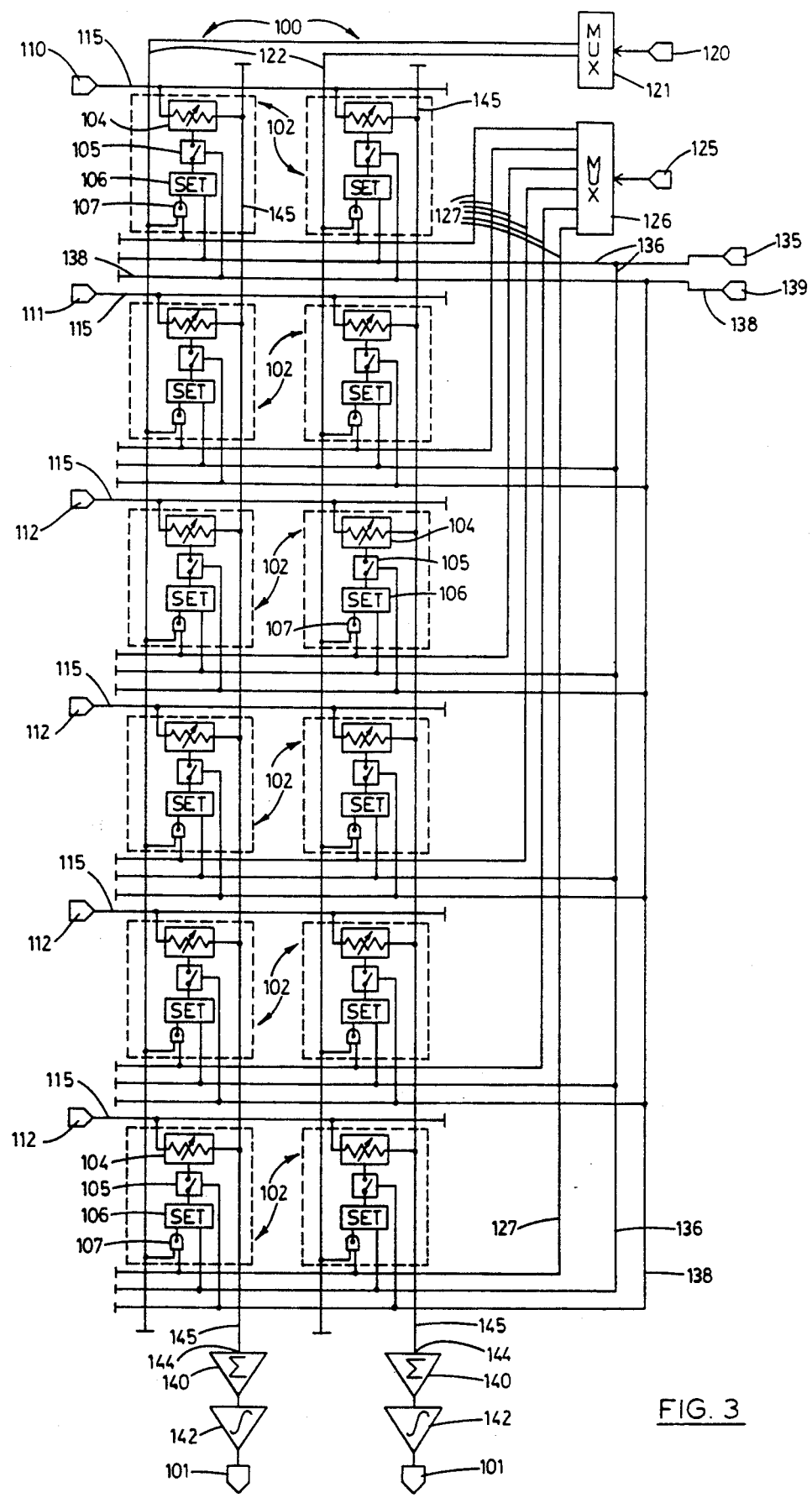
FIG. 3 is a diagram of a generalized artificial neural network depicted with conventionally represented elements and constructed for memory modification involving perturbation in accordance with the present invention.

FIG. 3 shows an artificial neural network (ANN) constructed in accordance with the present invention for neuron perturbation during memory modification. The FIG. 3 ANN is similar in a number of respects to the FIG. 1 ANN and is depicted substantially at the same conceptual level.

The FIG. 3 ANN has two neurons 100 corresponding to neurons 10, and each neuron 100 has an output or output terminal 101 corresponding to output 11 and providing an output signal of the neuron. Each neuron 100 is depicted as having six synapses 102. Each synapse 102 is substantially identical structurally to one of the synapses 13 and thus has a variable conductance or weight 104 corresponding to conductance 15 and similarly adjustable by a switch 105 corresponding to switch 37, a setting circuit 106 corresponding to circuit 33, and a gate 107 corresponding to gate 31.

The FIG. 3 ANN has six inputs or input terminals 110, 111 and 112, corresponding individually to the six synapses 102 of each neuron. Each of the terminals 110–112 corresponds structurally to one of the inputs 12 and is connected to the variable conductance 104 of the corresponding two of the synapses 102 by a conductor 115 which extends through these synapses. As subsequently described in greater detail, terminal 110 receives a perturbation signal for selectively perturbing the output signals of neurons 100, terminal 111 receives a balancing signal, and terminals 112 receive data signals corresponding functionally to those on inputs 12. It is evident that the number of synapses 102 is equal to the product of the number of input terminals 110–112 by the number of neurons 100 and that each synapse is associated with a corresponding one of the signals on a terminal 110–112 and with a corresponding one of the neurons 100. In the claims, a signal received at a terminal 112 is sometimes referred to an "input signal" with the associated conductor 115 referred to as an "input conductor" and the associated synapse 102 referred to as an "input synapse" Also in the claims, a signal received at terminal 110 is sometimes referred to as a "perturbation signal" with the associated conductor 115 being referred to as a "perturbation conductor" and the associated synapse 102 being referred to as a "perturbation synapse". The FIG. 3 ANN has a column or neuron select input 120, a neuron select multiplexer 121, neuron select conductors 122, a row or input select input 125, a row select multiplexer 126, row select conductors 127, a weight adjust amount input 135 and conductor 136, and a weight adjust select conductor 138 and input 139 corresponding to FIG. 1, elements identified by a numeral having a value one-hundred less than that of these FIG. 3 elements. It is apparent that each synapse 102 is individually and selectively addressable by these column and row select elements.

Figure 1:
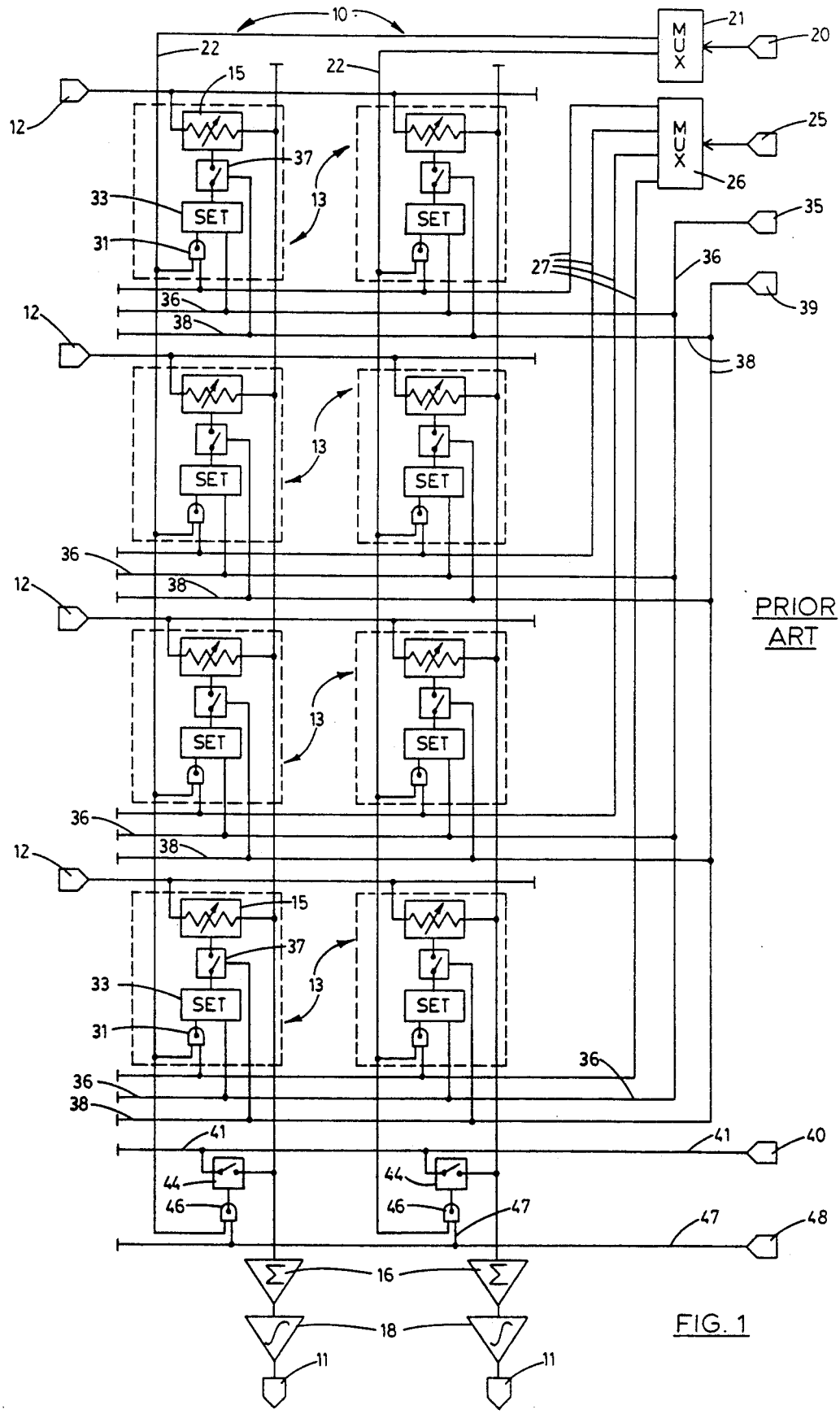
FIG. 1 is a diagram of a generalized artificial neural network depicted with conventionally represented elements and constructed for memory modification involving perturbation in accordance with the prior art.

Each neuron 100 has a summing circuit 140 and a function generator 142 which correspond, respectively, to the FIG. 1 elements 16 and 18 and which, taken together, may be considered as an output circuit of the neuron providing the output signal on the corresponding output terminal 101. Summing circuit 140 has an input connection 144, which is thus an input connection for such output circuit and from which a summing conductor 145 extends through every synapse 102 of the neuron. The variable conductance 104 of each synapse 102 connects the corresponding input conductor 115 from a terminal 110, 111, or 112 to the corresponding summing conductor so that at each synapse the effect of a signal on such terminal is selectively and adjustably weighted by the variable conductance. When the conductance 104 is implemented by a multiplier using a stored and selectively variable factor, such an effect is proportional to the factor. Such a multiplier may be a digital multiplier having the factor stored as a digital value; may be an analog multiplier, such as the two-quadrant multiplier 50 of FIG. 2, having the factor stored as a charge on a floating gate such as gate 51; or may be an analog multiplier having the factor set by a digital input.

It is apparent that, in each neuron 100, conductor 145 connects connection 144 to each synapse 102 of the neuron. As a result, the output signal, which is on the neuron terminal 101 and is generated by the summing circuit 140 and function generator 142 of the neuron, is determined by and depends on all of the input signals—perturbation, balancing, or data—on the terminals 110–112. The effect of each such input signal is selectively and independently weighted by each synapse receiving the signal. It is evident that this effect may be selectively set to or changed from a zero or other minimum effect by suitable adjustment of the weight represented by the variable conductance 104 of the synapse.

In each neuron 100, the synapse 102 thereof connected to perturbation terminal 110 selectively weights a predetermined perturbation signal on terminal 110. Therefore, variation of the weight of this synapse correspondingly varies a perturbation which is caused by this predetermined perturbation signal on the output signal provided by terminal 101 of the neuron. It is apparent that the data signals, which are received at the terminals 112, are received at a set of all the input terminals 110–112. Therefore, a signal received on the perturbation input 110 and a signal received on the balancing input 111 are each received on one of the input terminals excluded from such set. The data signals are thus a set of such input signals and the perturbation signal is another of such input signals. It is evident that the perturbation and balancing signals are received on different ones of the input terminals 110–112 excluded from the set thereof represented by terminals 112. Ii can be seen from FIG. 3 that the perturbation signal provided on terminal 110, which is excluded from such set, is conducted by the conductor 115 corresponding to terminal 110 to the synapses corresponding to this excluded terminal 110. It is can also be seen from FIG. 3 that the total number of input signals, which correspond individually to terminals 110–112, is greater than the number of data signals, which correspond to terminals 112.

A prior art ANN as shown in FIG. 1 and an ANN embodying the present invention as shown in FIG. 3 are both effective with a memory modification method wherein each output signal on a terminal such as a terminal 11 or 101 is perturbed independently of others of these output signals and independently of data signals on terminals such as terminals 12 or 112. In the prior art as shown in FIG. 1, perturbation is obtained by current injection directly into the summing circuit 16 by the action of elements 40, 41, and 44. However, perturbation in accordance with the present invention is obtained by input elements 110 and 115, by multiplexing elements 120, 121, 122, 125, 126, 127, and by synapses 102 substantially identical to such elements used for data input and weighing, thereby simplifying the construction of the ANN and associated circuits, facilitating connection of the ANN to these circuits, and eliminating the above-described problems due to such current injection elements by use of the FIG. 3 features of receiving data signals at a set of the input terminals 110–112 and receiving a perturbation signal at one of the input terminals, terminal 110, which is excluded from this set.

In accordance with a method of the present invention as used with an ANN such as that of FIG. 3, perturbation of one neuron 100 is obtained by first providing the ANN with a predetermined perturbation signal at terminal 110 and adjusting the weights, which are represented by variable conductances 104, of every synapse 102 connected to this terminal to give a predetermined minimum or effectively zero perturbation of the output signals on terminals 101 of the neuron. The ANN is thus placed in an unperturbed state. Desired data input signals are then provided to the ANN data input terminals such as those represented by terminals 112. When a neuron is to be perturbed, the one synapse of this neuron connected to terminal 110 is addressed and the weight of this one synapse is adjusted to a predetermined value which provides the summing circuit 140 of this neuron with a signal corresponding to the desired degree of perturbance of the output signal of this neuron. After perturbance, the neuron may be returned to its unperturbed state by readjusting the weight of this one synapse to give the minimum perturbance. It is apparent that, in a memory modification method when perturbation of one neuron of an ANN is achieved in this way, the output signals of the other neurons of the ANN are not perturbed and the data signals to the ANN, such as the signals provided to inputs 112, are not changed.

Similar advantages are provided by the use of one input of the inputs at terminals 110–112 and those synapses 102 corresponding to this one input for balancing the neurons 100. In an integrated circuit chip forming an ANN, the neuron output circuits, which are represented in FIGS. 1 and 3 by circuits 16 and 140 and function generators 18 and 142, typically have different characteristics. For one example, although the same signal is provided at the FIG. 3 input connection 144 of different such output circuits, different output signals are generated on the output terminals 101. As a result, memory modification methods requiring substantially the same output signal level change at terminals 101 for the same perturbation level of different neurons either do not converge to a set of values for the weights of synapses, such as 13 and 102, or else require an excessive number of cycles for convergence. Therefore in accordance with the present invention, a predetermined balancing signal is provided on terminal 111 and the synapse weights connected to this terminal are adjusted so that all of the neurons 100 provide substantially the same signal on their output terminals 101. For flexibility in selecting the balancing signal, this signal may be provided exteriorly of the ANN chip as suggested in FIG. 3 or, for simplicity in connection to the chip and more effective temperature compensation, the balancing signal may be provided by a signal source on the chip as suggested diagrammatically in FIGS. 4 and 5 in connection with a perturbation signal input.

In practice, the overall number of input terminals of an ANN is not significantly changed by the use of a few of these terminals for perturbation and balancing purposes since a practical ANN has, as before stated, a great many more such inputs than the four or six inputs to which FIGS. 1 and 3 have been limited for simplicity of exposition.

Figure 2:
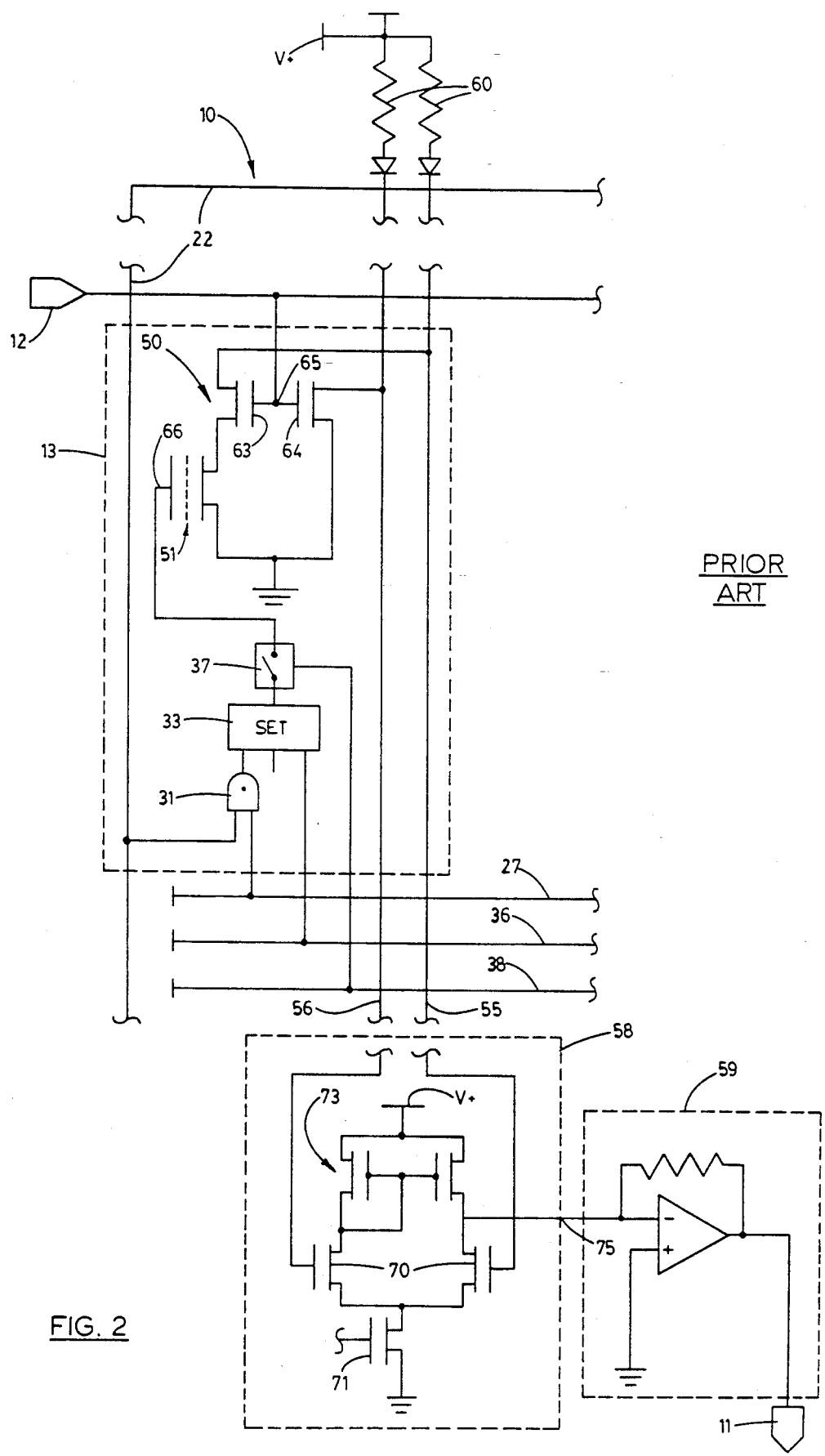
FIG. 2 is a more detailed diagram of representative prior art circuits which are for use in an artificial neural network such as that of FIG. 1 and which include floating gate transistors for weight storage.

In an ANN arranged generally as in FIG. 3, but having the weights of the synapses implemented with floating gate FET's as shown in FIG. 2, repeated adjustment of the weights to provide alternate minimum perturbation and effective perturbation would damage the FET as mentioned above. In accordance with the subject invention, this problem is avoided by providing an ANN, as shown by portions thereof in FIGS. 4 and 5, with switches indicated in FIG. 4 by numeral 150 and in FIG. 5 by numeral 151. These switches selectively connect and disconnect a perturbation signal, such as a signal provided on the FIG. 3 terminal 110, from neuron output circuits such as those represented by FIG. 3 elements 140 and 142 or by FIG. 2 amplifiers 58 and 59.

Figure 4:
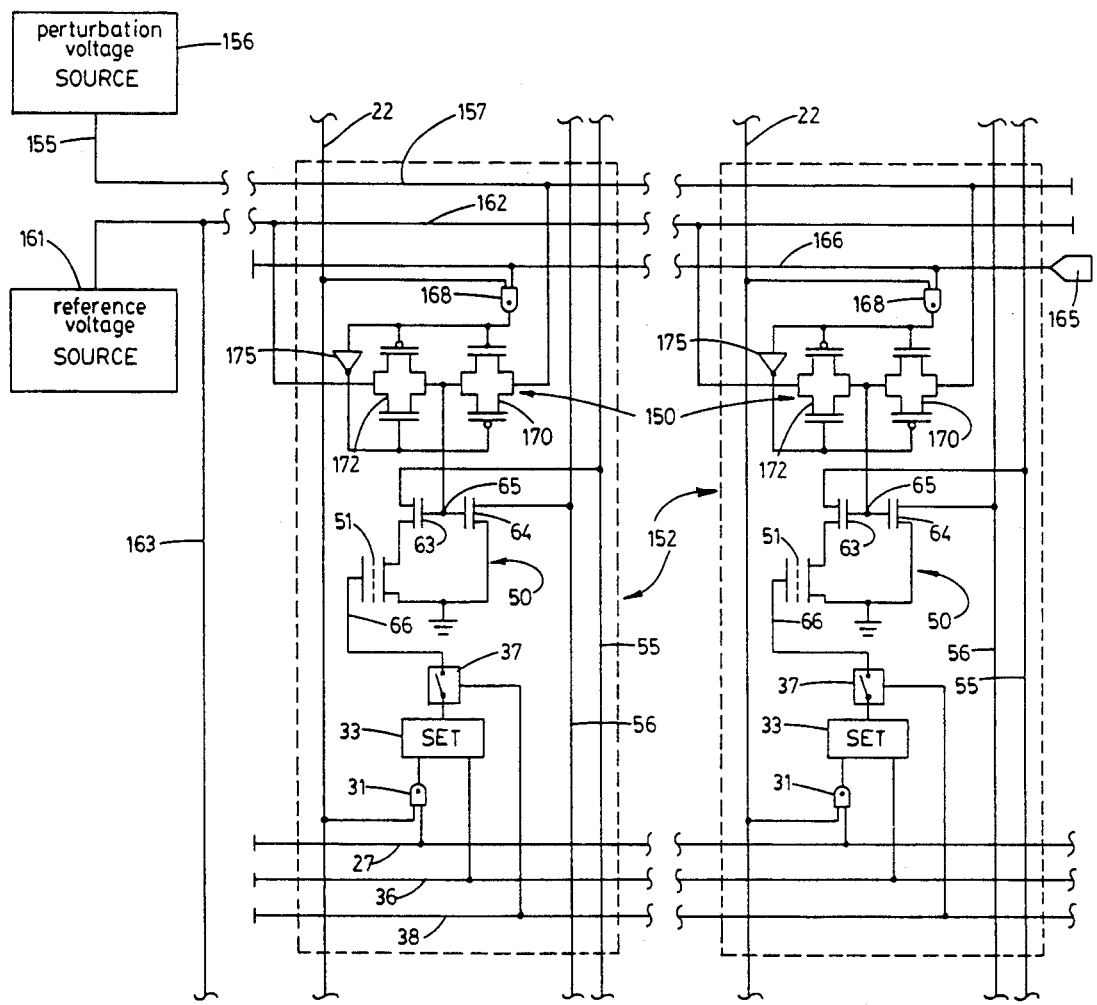
FIG. 4 is diagram showing a first switching arrangement for perturbation in accordance with the present invention using circuits similar to those of FIG. 2.
Figure 5:
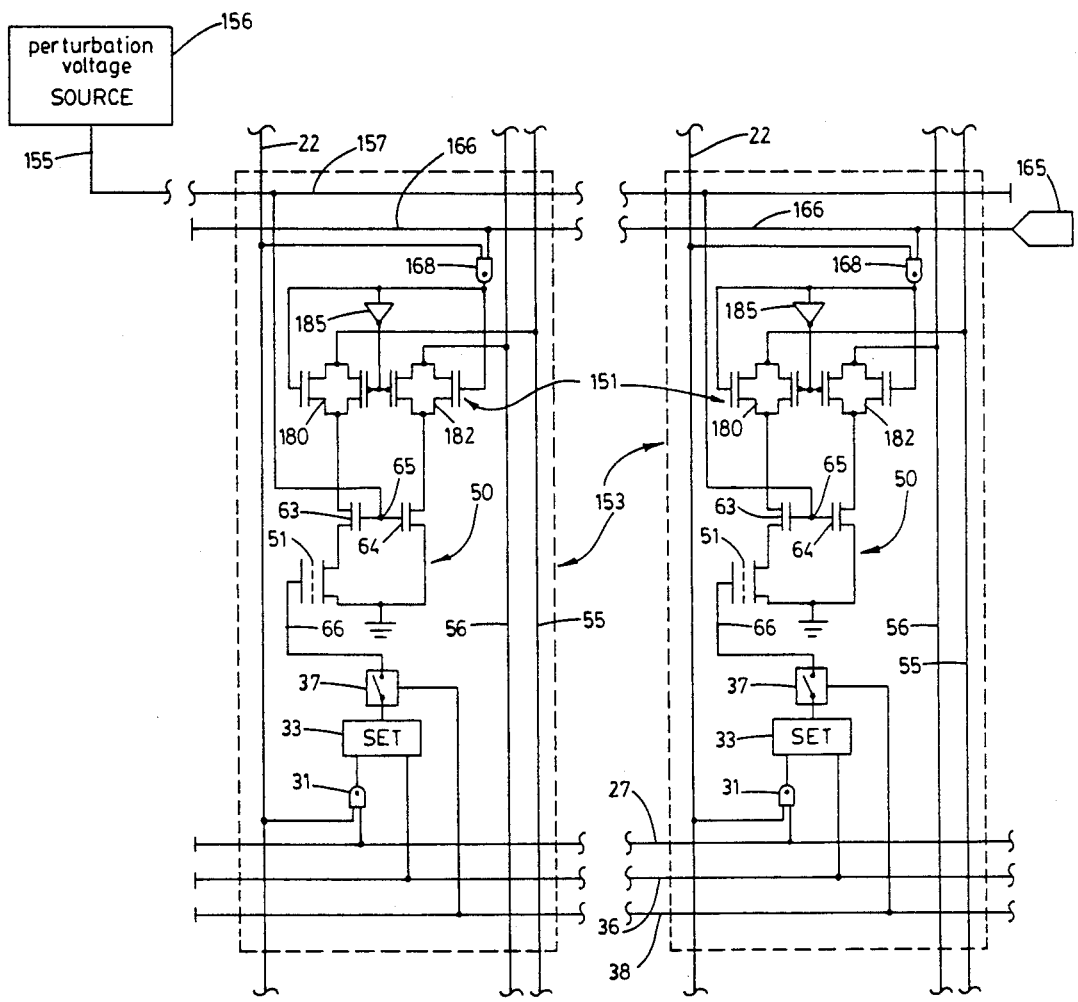
FIG. 5 is a diagram similar to FIG. 4 showing a second switching arrangement for perturbation in accordance with the present invention.

Switches 150 and 151 of an ANN of the present invention are disposed in certain synapses thereof indicated by numeral 152 in FIG. 4 and by numeral 153 in FIG. 5. Synapses 152 and 153 correspond to those FIG. 3 synapses 102 through which extends and is connected an input conductor, such as a FIG. 3 conductor 115 from the perturbation input terminal 110, which is excluded from the set of input terminals 112 used for data input.

For flexibility in providing the perturbation signal, the perturbation input terminal may be constructed, as suggested by the symbol referenced by numeral 110 in FIG. 3, to receive a perturbation signal, which has a predetermined level from outside a chip having the ANN. However as suggested by the FIGS. 4 and 5 diagrams, the perturbation input terminal may be the output 155 of a perturbation voltage source 156 constructed on the chip and connected to a perturbation input conductor 157 which extends through the synapses 152 and 153 and provides thereto a perturbation signal having a predetermined level. It is evident that, in either construction, the perturbation voltage terminal 155 is excluded from a set of data input terminals of the ANN, not shown in FIGS. 4 and 5, but corresponding to terminals 112 of FIG. 3. It is also evident that, in either construction switches 150 and 151 are disposed in synapses, such as synapses 152 and 153, corresponding to a perturbation signal such as that provided to these synapses by a conductor such as conductor 157.

In the FIG. 4 embodiment, the ANN is depicted as having a reference voltage source 161 connected to a reference conductor 162 extending through the synapses 152, source 161 typically being used as a reference, as by a conductor 163, for other elements such as CMOS circuits, not shown, formed on the chip. Construction of voltage sources 156 and 161 on the chip eliminates external connections thereto and temperature differences between the voltage sources and other chip elements. The reference voltage source may, of course also be located externally of the chip.

The ANN portions shown in FIGS. 4 and 5 have a perturbation select terminal 165 from which a perturbation select signal conductor 166 extends through the synapses 152 or 153 through which the perturbation signal conductor 157 also extends. The FIG. 4 and 5

ANN portions also include multiplexing elements 22, 27 and 31; weight adjustment elements 33, 36, 37, 38, and 66; a multiplier 50 having a floating gate FET 51 and other FET's 63 and 64; and a positive summing node or conductor 55 and a negative summing node or conductor 56, these elements being substantially identical to those elements of FIGS. 1-3 identified by the same numeral. Each synapse 152 or 153 is represented as having an AND gate 168 receiving the signals on conductor 166 and the neuron select conductor 22 associated with the neuron having the synapse, the output of gate 168 being provided to the switch 150 or 151 of the synapse to selectively operate the switch to pass or to block passage of the perturbation signal on conductor 157 through the synapse when the synapse is addressed by a signal on conductor 22.

Referring to a switch 150 in greater detail in FIG. 4, it is seen that this switch has a first pair 170 and a second pair 172 of n-channel and p-channel FET's. The sources of these FET's are connected to each other and to the common connection point 65 of the gates of FET's 63 and 64 of multiplier 50 which weights the effect of a perturbation conductor 157 voltage signal on the current summing nodes 55 and 56. The drains of FET pair 170 are connected to conductor 157 and the drains of FET pair 172 are connected to reference voltage signal conductor 162. The output of perturbation select gate 168 is connected directly to the gate of the n-channel FET of pair 170 and to the gate of the p-channel FET of pair 172, and the output of this gate is connected through an invertor 175 to the gate of the p-channel FET of pair 170 and to the gate of the n-channel FET of pair 172.

Switch 150 is thus constructed so that selection of a synapse 152 for perturbation by its gate 168 causes an FET of pair 170 to conduct the perturbation signal to multiplier 50 of the synapse to perturb the neuron having the synapse to an extent determined by the product of the perturbation signal level and the synapse weight corresponding to the charge on the floating gate of FET 51. However when the synapse is not so selected, an FET of pair 172 conducts the reference signal to multiplier 50 removing the perturbation. The use of n-channel and p-channel FET's in pairs 170 and 172 thereof ensures conduction regardless of the relative gate to source voltages transistors 63 and 64 and a conductor 157 or 162. It is evident that switch 150 connects perturbation signal conductor 157 and summing nodes 55 and 56 to cause a perturbation of the output signal on a neuron output terminal corresponding to terminal 11 of FIG. 2 or terminal 101 of FIG. 3. It is also evident that, to remove the perturbation, switch 150 disconnects conductor 157 and nodes 55 and 56 and connects conductor 162 to these nodes.

Referring to a switch 151 of a synapse 153 in greater detail in FIG. 5, it is seen that this switch has a first pair 180 and a second pair 182 of n-channel and p-channel FET's. The drains of FET pair 180 are connected together and to positive node 55 of the neuron having this synapse, and the sources of FET pair 180 are connected together and to the channel of FET 63 of multiplier 50 which weights the effect of a perturbation voltage signal on conductor 157 on the current summing nodes 55 and 56. The drains of FET pair 182 are connected together and to negative node 56, and the sources of FET pair 180 are connected together and to the channel of FET 64 of multiplier 50. The output of perturbation select gate 168 is connected directly to the gate of the n-channel FET of pair 180 and to the gate of the n-channel FET of pair 182, the output of gate 168 being connected through an invertor 185 to the gates of the p-channel FET's of these FET pairs.

Switch 151 is thus constructed so that selection of a synapse 153 for perturbation by its gate 168 causes a FET of each pair 180 and 182 to conduct, thereby connecting the perturbation signal by way of multi plier 50 of the synapse to both nodes 55 and 56 and perturbing the neuron having the synapse to an extent determined by the product of the perturbation signal level and the synapse weight corresponding to the charge on the floating gate of FET 51. The use of n-channel and p-channel FET's in pairs 180 and 182 thereof ensures conduction regardless of the relative voltages of nodes 55 and 56 and multiplier 50. However if these relative voltages are predetermined, single FET's, p-channel or n-channel depending on the relative voltages, may be used instead of n-channel and p-channel pairs. When the synapse is not selected for perturbation by gate 168, the FET's do not conduct thereby disconnecting multiplier 50 and the synapse from nodes 55 and 56. Switch 151 thus selectively connects perturbation signal conductor 157 and summing nodes 55 and 56 to cause a perturbation of the output signal on a neuron output terminal corresponding to terminal 11 of FIG. 2 or terminal 101 of FIG. 3, and switch 151 disconnects conductor 157 from nodes 55 and 56 to remove the perturbation.

The following facts will be evident from FIGS. 2, 4, and 5 and the above description of the elements shown therein. Both the input signal on a conductor 12, FIG. 2, and the perturbation signal on a conductor 157, FIGS. 4 and 5, are represented by a voltage level. A data input synapse 13, FIG. 2, determines first currents on nodes 55 and 56, these currents corresponding to the voltage level of the input signal. Similarly, a perturbation synapse 152 or perturbation synapse 153 determines second currents on nodes 55 and 56, these second currents corresponding to the voltage level of the perturbation signal. As a result, summing elements corresponding to amplifiers 58 and 59 of FIG. 2 generate an output signal, such as that on terminal 11, which corresponds to the sums of such first currents and such second currents.

It is also evident that the variable charge on FET 51 of a perturbation synapse 152 or 153 weights the perturbation signal on the associated conductor 157 so as to vary a perturbation of the output signal, such as that on a FIG. 2 terminal 11, caused by the perturbation signal. As described above, a switch 150 or 151 selectively connects and disconnects the conductor 157 and summing elements such as amplifiers 58 and 59 so that the output signal is selectively perturbable by a switch 150 or 151 without varying said charge on FET 51.

It is further evident that, in an ANN, the charges on the floating gates of FET's 51 of the perturbation synapses 152 or 153 of every neuron, such as a neuron 10 or 100, may be initially adjusted to give a desired perturbation of an output signal, such as that on a terminal 101, when a predetermined perturbation signal level is provided for the ANN as on a conductor extending from a terminal such as a terminal 112 or on a conductor corresponding to a conductor 157. Subsequently, perturbation of the output signal of a selected neuron is obtained by operating the switch 150 or 151 of a synapse 152 or 153 corresponding to the perturbation signal and to the neuron so that the perturbation signal is passed by the synapse 152 or 153. On the other hand, a minimum effect of the perturbation signal on the output signal may be obtained by operating the switch to block passage of the perturbation signal through the synapse. A desired output signal may be thus repeatedly perturbed by selecting and deselecting the corresponding perturbation synapse without changing either a perturbation determining floating gate charge of the perturbation synapse or such a perturbation signal level.

Method for Neuron Perturbation

Figure 6:
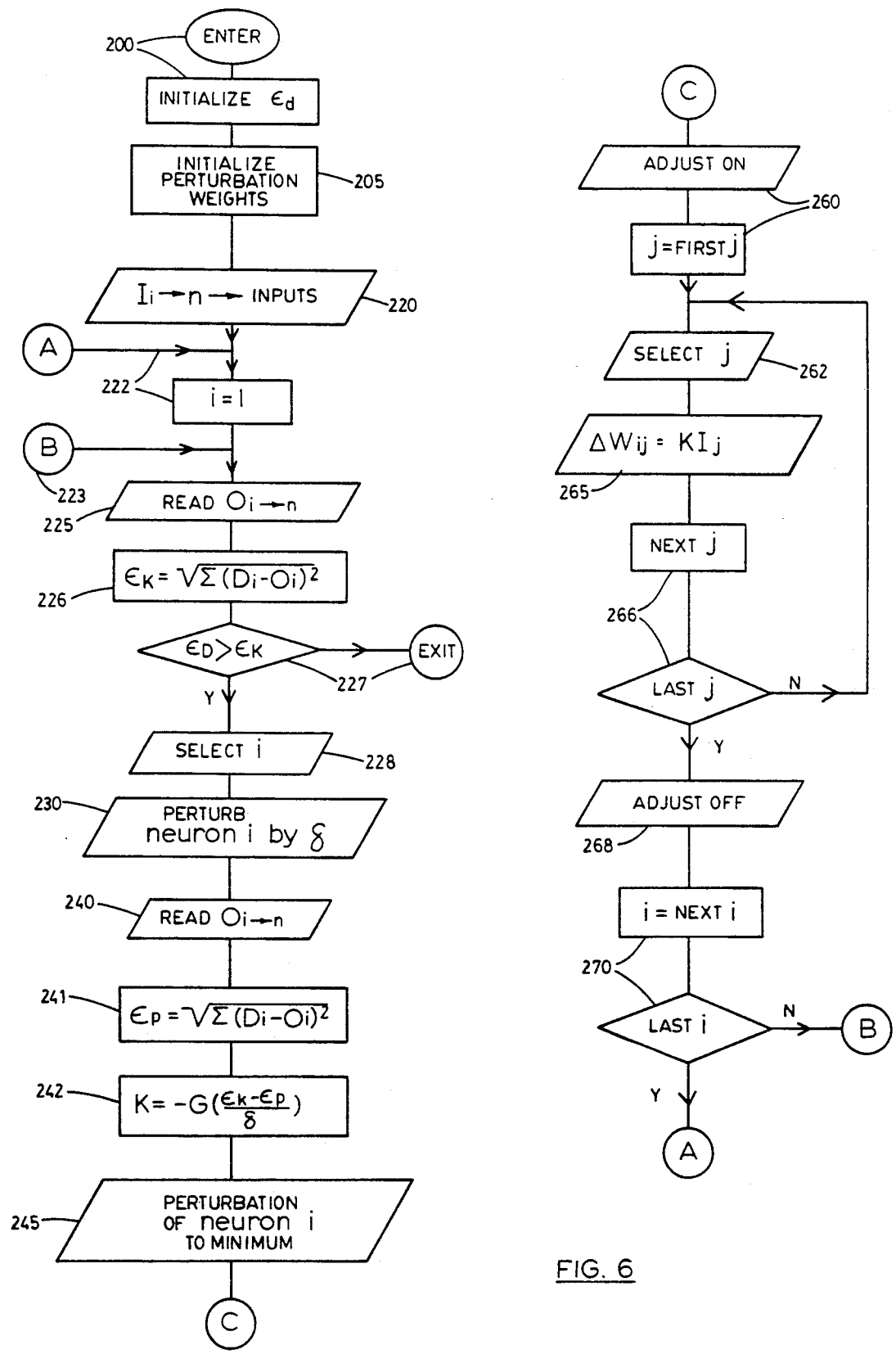
FIG. 6 is a flow chart of a representative method of artificial neural network memory modification, this method using perturbation in accordance with the present invention.
Figure 7A:
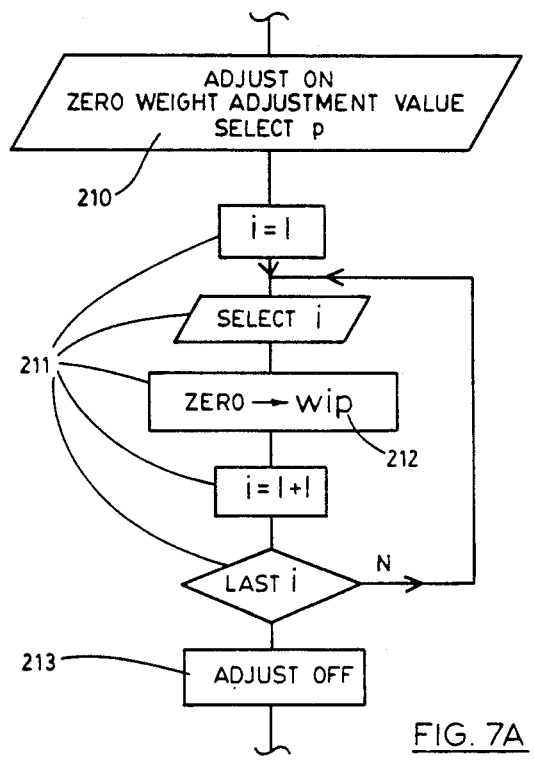
FIGS. 7A, 7B, and 7C are flow chart blocks corresponding to portions of the flow chart of FIG. 6 and showing a first manner of such perturbation effective with the network of FIG. 3.
Figure 8A:
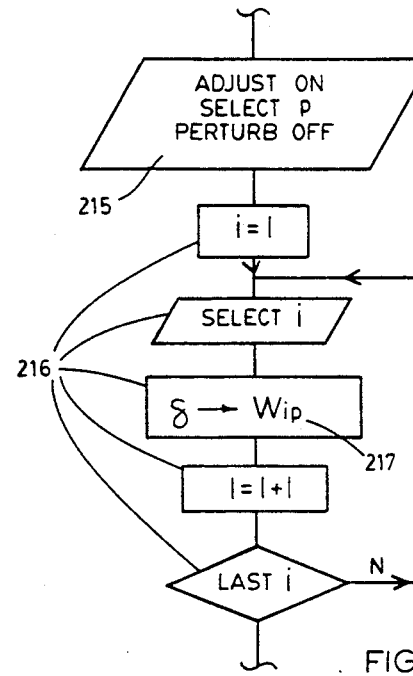
FIGS. 8A, 8B, and 8C are flow chart blocks corresponding to portions of the flow chart of FIG. 6 and showing a second manner of such perturbation effective with the switching arrangements of FIGS. 4 and 5.
Figure 7B:
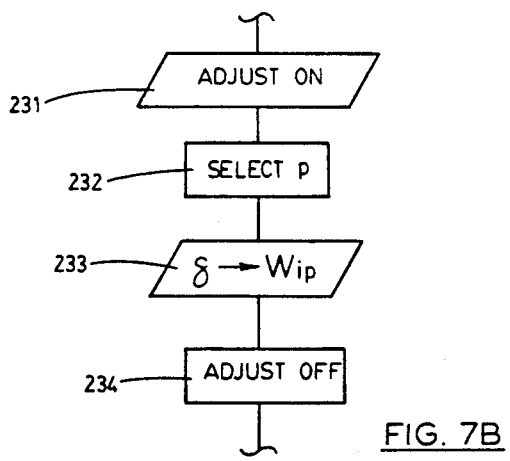
Figure 8B:
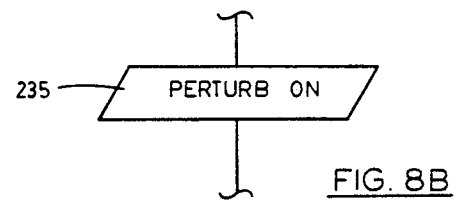
Figure 7C:
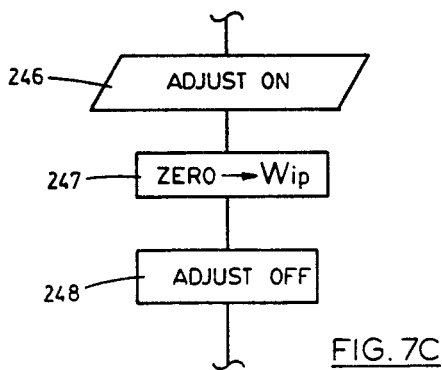
Figure 8C:
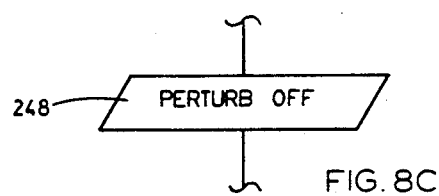

FIGS. 6–8 are flow charts of a method of for neuron perturbation during memory modification using the circuits of FIGS. 3–5. The flow chart of FIG. 6 is appropriate for the circuits of all of the FIGS. 3–5 while FIGS. 7A–7C have substitute flow chart blocks appropriate for the circuits of FIG. 3 and FIGS. 8A–8C have substitute flow chart blocks appropriate for the circuits of FIG. 4 or FIG. 5. The overall method of FIG. 6, which may be termed a "Madeline" method since it involves perturbation of individual neurons, is only a representative method using the subject invention which is embodied in steps set forth in some of the flow chart blocks of FIGS. 6–8 and which may practiced as a portion of other methods than that now to be described.

To start the method, as shown by blocks 200 of FIG. 6, a predetermined desired error $\epsilon_d$ is provided. This and other error values mentioned below are, typically, the square root of the sum of the squares of the differences between the output signal $O_i$ of each neuron, such as a neuron 100, as provided at a terminal, such as a terminal 101, and a desired output signal $D_i$ of the neuron, the subscript "$i$" being used herein to specify particular neurons. As indicated by block 205, FIG. 6, and by FIGS. 7A and 8A, the weights of the synapses used for perturbation, are then initialized, such synapses corresponding to the FIG. 3 synapses 102 associated with terminal 110, to the FIG. 4 synapses 152, and to the FIG. 5 synapse 153.

When, as with the ANN of FIG. 3 and as shown in FIGS. 7A–7B, each perturbation is to be obtained by changing the weight, represented by $w_{ip}$, of a desired neuron "$i$" at a perturbation synapse "$p$" thereof, every perturbation weight is initially set, as shown in FIG. 7A, so that no perturbation occurs. To do this, first and as shown in block 210 of FIG. 7A, weight adjustment is selected by providing an "on" signal to terminal 139; a signal causing a selected weight to be adjusted to a value resulting in no output signal effect for any valid signal on terminal 110 is provided at terminal 138; and the perturbation synapses are selected by a suitable signal at terminal 125 to row multiplexer 126. Next, and as indicated by blocks 211, signals are provided, as at terminal 120 to column multiplexer 121, to select neurons 100 in succession, each perturbation synapse weight $w_{ip}$ being "zeroed" as indicated by numeral 212 when the corresponding neuron is selected. It is evident that these zeroed weights will result in a minimum perturbation of the output signals such as those on terminals 101 when predetermined data input signals are provided in terminals such as terminals 112. Weight adjustment is then deselected, as indicated by block 213, by an "off" signal to terminal 139.

When, as with the circuits of FIGS. 4 and 5 and as shown in FIGS. 8A–8B, each perturbation is obtained by operation of a switch 150 or 151 with each weight stored as the charge on the floating gate of FET 51 remaining unchanged, the charges are initialized as shown in FIG. 8A. To do this, first and as shown in block 215 of FIG. 8A, weight adjustment is selected by providing an "on" signal to a terminal corresponding to terminal 139, and the perturbation synapses are selected. There is then provided to terminal 165 a signal causing each switch 150 or 151 to disconnect a perturbation signal conductor, such as a conductor 162, from the nodes 55 and 56 and thus from summing and output elements such as FIG. 2 amplifiers 58 and 59. The effect of a signal on a conductor 157 on nodes 55 and 56 is thereby blocked. Next and as indicated by blocks 216, signals are provided, as at a terminal 120 to a column multiplexer 121, to select neurons such as neurons 100 in succession. As the neurons are so selected, each perturbation synapse weight $w_{ip}$ thereof is set as indicated by numeral 217 to a value which will cause a predetermined perturbation $\delta$ of each neuron output signal on a terminal such as a terminal 101. The weight value so set is determined by predetermined pulses or other suitable signal on a terminal corresponding to FIG. 3 terminal 135.

As indicated by block 220, each of the desired, predetermined data input values $I_i$ are then provided to the ANN at terminals corresponding to terminals 112. As indicated by numeral 222, a loop which successively perturbs the neurons and adjusts their weights is then entered, the iteration on each neuron being indicated by a subscript "$k$" and beginning at a point indicated by numeral 223 In each loop the neuron outputs $O_i$ are first read as indicated by numeral 225. It is evident that the summing and other output circuits, such as those indicated by numerals 58 and 59 in FIG. 2 or by numerals 10 and 142 in FIG. 3, of the neurons, such as the FIG. 3 neurons 100, then generate first values of neuron output signals corresponding only to the predetermined values of the input signals. The error $\delta_k$ for the unperturbed ANN is then calculated as indicated by numeral 226. As indicated by numeral 227, the method exits if memory modification in accordance therewith has brought the error within the desired range. If the desired error has not been attained, the current neuron elements are then selected as indicated by numeral 228 by a suitable signal as at a terminal such as a terminal 120 to column multiplexer 121.

The output of this current neuron is then perturbed by amount $\delta$ as indicated by numeral 230 in FIG. 6. This perturbation is achieved with the ANN of FIG. 3 as shown in FIG. 7B where weight adjustment is then selected, as indicated by block 231, by an "on" signal to terminal 139. The perturbation neurons are then selected, as by a suitable signal to terminal 125 and row multiplexer 126 and as indicated by numeral 232, resulting in selection of the perturbation synapse having $w_{ip}$ since the neuron is already selected. The weight value causing perturbation $\delta$ is then loaded, as by suitable signals applied to adjust select terminal 138 and weight adjust amount terminal 135 and as indicated by numeral 233. As a result of loading this weight, the output signal, such as that on a terminal 101, of the selected neuron will undergo a larger perturbation than is caused by the previously loaded minimum or zero weight. Weight adjustment is next deselected, as indicated by block 234, by an "off" signal to terminal 139.

With an ANN having the circuits f FIGS. 4 and 5, the neuron already selected is perturbed, as indicated in block 235 of FIG. 8B, simply by providing a perturbation "on" signal to a terminal such as terminal 165 causing switch 150 or 151 of the perturbation synapse 152 or 153 of the neuron to connect the perturbation signal conductor 157 to nodes 55 and 56 and thus to the summing and output circuits, such as amplifiers 58 and 59 of FIG. 2, and thus pass the effect of a signal on a conductor 157 on to nodes 55 and 56. However, the switches 150 or 151 of the other synapses, which receive the perturbation signal from conductor 157 but are located in other neurons than the current or selected neuron, continue to block the effect of this signal on nodes 55 and 56 so that the output signals of these other neurons are not perturbed.

With the selected neuron so perturbed, all of the neuron outputs $O_i$, such as those at terminals 101, are then read again as indicated by numeral 240. It is evident that the above mentioned summing and other output circuits of the neurons, such as the FIG. 3 neurons 100, then generate a second neuron output signal values corresponding to the predetermined value of the data input signals, such as those on terminals 112, and also corresponding to the value of the perturbation signal on a terminal such as terminal 110 or on a conductor 157. Next, the error $\epsilon_p$ for the perturbed ANN is calculated as indicated by numeral 241. As shown in block 242, a correction factor "K" is calculated as the product of a gain "G" times the difference between the unperturbed error $\epsilon_k$ and the perturbed error $\epsilon_p$ divided by the perturbation amount $\delta$. The gain is indicated as negative to show that the correction being developed is in direction to reduce the unperturbed error.

The perturbation of the selected neuron is then removed as indicated in FIG. 6 at block 245. With the ANN of FIG. 3 this is done by selecting weight adjustment in the manner previously described and as indicated by numeral 246. As indicated by numeral 247, the weight value causing minimum or zero perturbation is then reloaded into the already selected perturbation synapse, as by suitable signals applied to adjust select terminal 138 and weight adjust amount terminal 135. Weight adjustment is then deselected as indicated by block 248. However with an ANN having the circuits of FIGS. 4 and 5, the perturbation of the already selected neuron is removed, as indicated in block 235 of FIG. 8B, simply by providing a perturbation "off" signal on terminal 165 thereby causing switch 150 or 151 of the perturbation synapse 152 or 153 of the neuron to again block the effect of a signal on a conductor 157 on to nodes 55 and 56.

It is apparent that the calculations indicated in blocks 226, 241, and 242 have the effect of comparing first or unperturbed values of ANN output signals, such as those indicated by $O_i$ and provided on FIG. 1 terminals 101, with second or perturbed values to determine the changes in these output signals caused by a perturbation signal, such as that provided on terminal 110 or conductor 157, in relation to desired changes of these signals toward their desired values indicated by $O_d$. The results of these calculations are utilized for memory modification in a manner now to be described.

In the selected neuron which has just been perturbed, the weights determining the effect of data input signals, such as those on terminals 112 of FIG. 3, on the output signal, such as that on a terminal 101, of the neuron are then adjusted by use of the above-defined correction factor "K" so as to change this output signal in a direction toward the desired value $D_i$ of this signal from its unperturbed value as read in block 225. This may be done by, first and as indicated by numeral 260 in FIG. 6, selecting weight adjustment, as by an "on" signal to terminal 139 and by initializing the loop to the first of the synapses having these weights, these synapses being identified by the subscript "j". A synapse having such a weight is then selected, as indicated by numeral 262, by an input on a terminal such as 125 to row multiplexer 126. As shown in block 265, the desired change $\Delta w_{ij}$ in the weight is then calculated as the product of the factor K and the level of the input $I_j$ to the synapse. The result of this calculation is then provided to the synapse weight, such as that represented by a variable conductance 105 in FIG. 3 or determined by charges on the floating gates of transistors 51 in FIGS. 4 and 5. The next synapse of the selected neuron is then selected as indicated by numeral 266. When adjustment of the synapse weights is completed, weight adjustment is deselected as indicated by block 268.

The method then advances to the next neuron to be perturbed as indicated by numeral 270 and loops back to the actions indicated by numeral 222 and 223.

Obviously, many modifications and variations of the present invention are possible in light of the above teachings. It is, therefore, to be understood that the invention may be practiced within the scope of the following claims other than as specifically described herein.

What is claimed is:

1. An artificial neural network comprising:
an input conductor carrying an input signal;
summing means for generating an output signal determined by said input signal;
an input synapse connecting said input conductor to said summing means and having means for selectively weighting the effect of the input signal on the output signal;
a perturbation conductor carrying a perturbation signal for perturbing said output signal;
a perturbation synapse connecting said perturbation conductor to said summing means; and
switching means for selectively
connecting said perturbation conductor and said summing means to cause a perturbation of said output signal, and
disconnecting said perturbation conductor and said summing means to remove said perturbation.

2. The artificial neural network of claim 1 wherein:
to cause said perturbation, said switching means connects said perturbation synapse to said summing means; and
to remove said perturbation, said switching means disconnects said perturbation synapse from said summing means.

3. The artificial neural network of claim 1 wherein:
said network includes a reference conductor carrying a reference signal;
to cause said perturbation, said switching means connects said perturbation synapse to said perturbation conductor to provide said perturbation signal to said perturbation synapse; and
to remove said perturbation, said switching means disconnects said perturbation synapse from said perturbation conductor and connects said perturbation synapse to said reference conductor to provide said reference signal to said perturbation synapse.

4. An artificial neural network comprising:
an input conductor carrying an input signal;
summing means for generating an output signal determined by said input signal;

an input synapse connecting said input conductor to said summing means and having means for selectively weighting the effect of the input signal on the output signal;

a perturbation conductor carrying a perturbation signal for perturbing said output signal;

a perturbation synapse connecting said perturbation conductor to said summing means;

means having a variable charge for weighting the perturbation signal so as to vary a perturbation of the output signal caused by the perturbation signal; and switching means for selectively connecting and disconnecting said perturbation conductor and said summing circuit so that said output signal is selectively perturbable without varying said charge.

5. An artificial neural network for use with a memory modification method including the steps of:

providing a predetermined value of said input signal so that said summing means generates a first value of said output signal, said first value corresponding to said predetermined value of said input signal;

perturbing said output signal by said perturbation signal so that said summing means generates a second value of said output signal, said second value corresponding to said predetermined value of said input signal and to said perturbation signal;

comparing said first value and said second value with a desired value of said output signal to provide a determination of a change in said output signal caused by said perturbation signal in relation to a change in said output signal toward said desired value from said first value; and weighting said input signal by said input synapse in accordance with said determination so as to change said output signal in a direction from said first value toward said desired value, the artificial neural network comprising:

an input conductor carrying an input signal;

summing means for generating an output signal determined by said input signal;

an input synapse connecting said input conductor to said summing means and having means for selectively weighting the effect of the input signal on the output signal;

a perturbation conductor carrying a perturbation signal for perturbing said output signal;

a perturbation synapse connecting said perturbation conductor to said summing means; and switching means for selectively connecting and disconnecting said perturbation conductor and said summing circuit, and in said method:

the step of providing said predetermined value of said input signal to generate said first value of said output signal includes disconnecting said perturbation conductor and said summing means by said switching means; and the step of perturbing said output signal includes connecting said perturbation conductor and said summing means by said switching means.

6. The method of using an artificial neural network which:

receives a plurality of data signals;

generates a plurality of output signals, each of said output signals depending on all of said data signals;

has a plurality of input terminals;

has a plurality of output circuits, each of said output circuits generating one of said output signals;

has a plurality of synapses, each of said synapses connecting one of said input terminals to one of said output circuits and including means for weighting an effect of a signal received at said one of the input terminals on the one of said output signals generated by said one of said output circuits, has an input connection to each of said output circuits, the synapses corresponding to the output circuit being connected to said input connection; and has a first one of said output circuits generating a different output signal than a second one of said output circuits when the same signal is provided at said input connection of said first output circuit and at said input connection of said second output circuit, wherein the method comprises:

receiving said plurality of data signals at a set of said input terminals;

receiving a perturbation signal at one of said input terminals excluded from said set;

perturbing said output signals by said perturbation signal, each of said output signals being perturbed independently of others of said output signals and independently of said data signals;

receiving a balancing signal at one of said input terminals excluded from said set so that a synapse of said first output circuit and a synapse of said second output circuit receive said balancing signal; and adjusting the effect of the balancing signal by the weighting means of said synapse of said first output circuit and by the weighting means of said synapse of said second output circuit so that said first output circuit and said second output circuit generate substantially the same output signal when substantially the same signals are received at said set of said input terminals 7. The method of claim 6 for using an artificial neural network including receiving said perturbation signal at a different one of said input terminals than the one of said input terminals receiving said balancing signal.

8. The method of using an artificial neural network which:

receives a plurality of data signals;

generates a plurality of output signals, each of said output signals depending on all of said data signals;

is used with a memory modification method wherein each of said output signals is perturbed independently of others of said output signals and independently of said data signals;

has a plurality of input terminals;

has a plurality of output circuits, each of said output circuits generating one of said output signals;

has a plurality of synapses, each of said synapses connecting one of said input terminals to one of said output circuits, and including means for weighting an effect of a signal received at said one of the input terminals on the one of said output signals generated by said one of said output circuits;

has a plurality of summing conductors, each summing conductor extending from one of said output circuits to each of said synapses which connect said input terminals to the output circuit;

has a plurality of input conductors, each input conductor extending from one of said input terminals to each of said synapses which connect said one input terminal to said output circuits; and has each of said synapses connected the input conductor which extends to the synapse to the summing conductor which extends to the synapse, so that said perturbation signal is conducted from said one of said input terminals excluded from said set thereof through the input conductor corresponding to said excluded input terminal to the synapses corresponding to said excluded input terminal, wherein the method comprises:

receiving said plurality of data signals at a set of said input terminals;

receiving a perturbation signal at one of said input terminals excluded from said set; and selectively connecting and disconnecting said excluded input terminal from the summing conductor extending to each of said synapses to which one of said input conductors extends from said excluded input terminal.

9. In an artificial neural network which:

receives a plurality of input signals;

has a plurality of neurons, each of said neurons providing an output signal which may depend on all of said input signals;

has a plurality of individually addressable synapses equal in number to the product of the number of said input signals and the number of said neurons, each of said synapses having a corresponding one of said input signals and a corresponding one of said neurons, determining an effect of said corresponding input signal on the one of said output signals provided by said corresponding neuron, and including means for retaining a factor, multiplier means for determining said effect as the product of said factor and the level of said corresponding input signal, and means for varying said factor when the synapse is addressed;

is used with a plurality of data signals; and is used with a memory modification method in which a predetermined perturbation is generated in said output signal of one of said neurons while said data signals are substantially unchanged, the improvement comprising generating said perturbation in said output signal of a selected one of said neurons without perturbing said output signal of the others of said neurons by the steps of:

providing a number of said input signals greater than the number of said data signals;

receiving said data signals as a set of said input signals;

providing a perturbation signal as another of said input signals;

setting said factor retained by the one of said synapses corresponding to said perturbation signal and corresponding to said selected neuron to a non-zero value corresponding to a predetermined said perturbation; and providing, through the one of said synapses corresponding to said perturbation signal and corresponding to each of the others of said neurons than said selected neuron, a minimum effect of said perturbation signal on the output signal of each of said others of said neurons.

10. The improvement of claim 9 wherein said minimum effect is generated by setting said factor substantially to zero in said synapses corresponding to said perturbation signal and corresponding to said others of said neurons.

11. The improvement of claim 9 further comprising:

providing a predetermined level of said perturbation signal;

providing a switch at each of said synapses corresponding to said perturbation signal, the switch being selectively operable when the synapse is addressed to pass and to block passage of a signal corresponding to said perturbation signal through the synapse;

generating said perturbation of said selected neuron by operating said switch of the one of said synapses corresponding to said perturbation signal and corresponding to said selected neuron to pass said signal corresponding to said perturbation signal; and generating said minimum effect of said perturbation signal on the output signal of each of said others of said neurons by operating said switch of each of said synapses corresponding to said perturbation signal and corresponding to each of said others of said neurons to block said signal corresponding to said perturbation signal.

* * * * *